Sept. 1, 1959 F. B. COKER ET AL 2,902,636
RECORDING SYSTEM
Filed Nov. 12, 1953 3 Sheets-Sheet 1
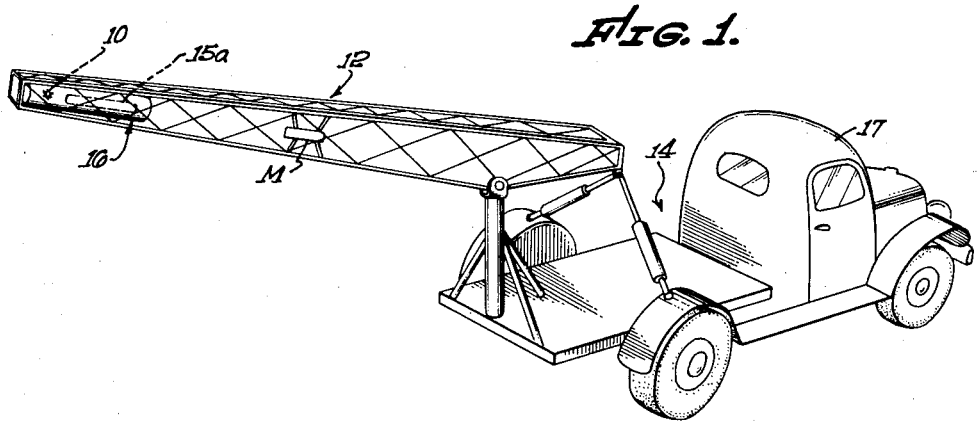
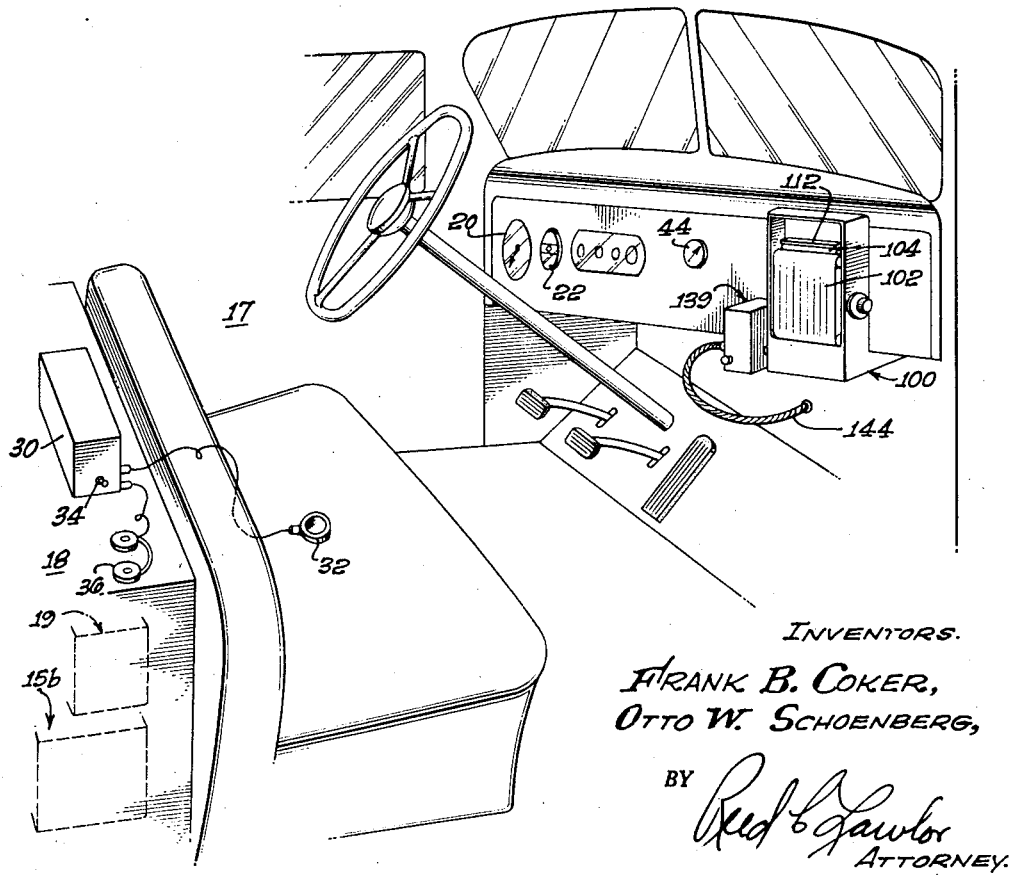
INVENTORS.
FRANK B. COKER,
OTTO W. SCHOENBERG,
BY
ATTORNEY.

Sept. 1, 1959
F. B. COKER ET AL
2,902,636
RECORDING SYSTEM
Filed Nov. 12, 1953
3 Sheets-Sheet 2
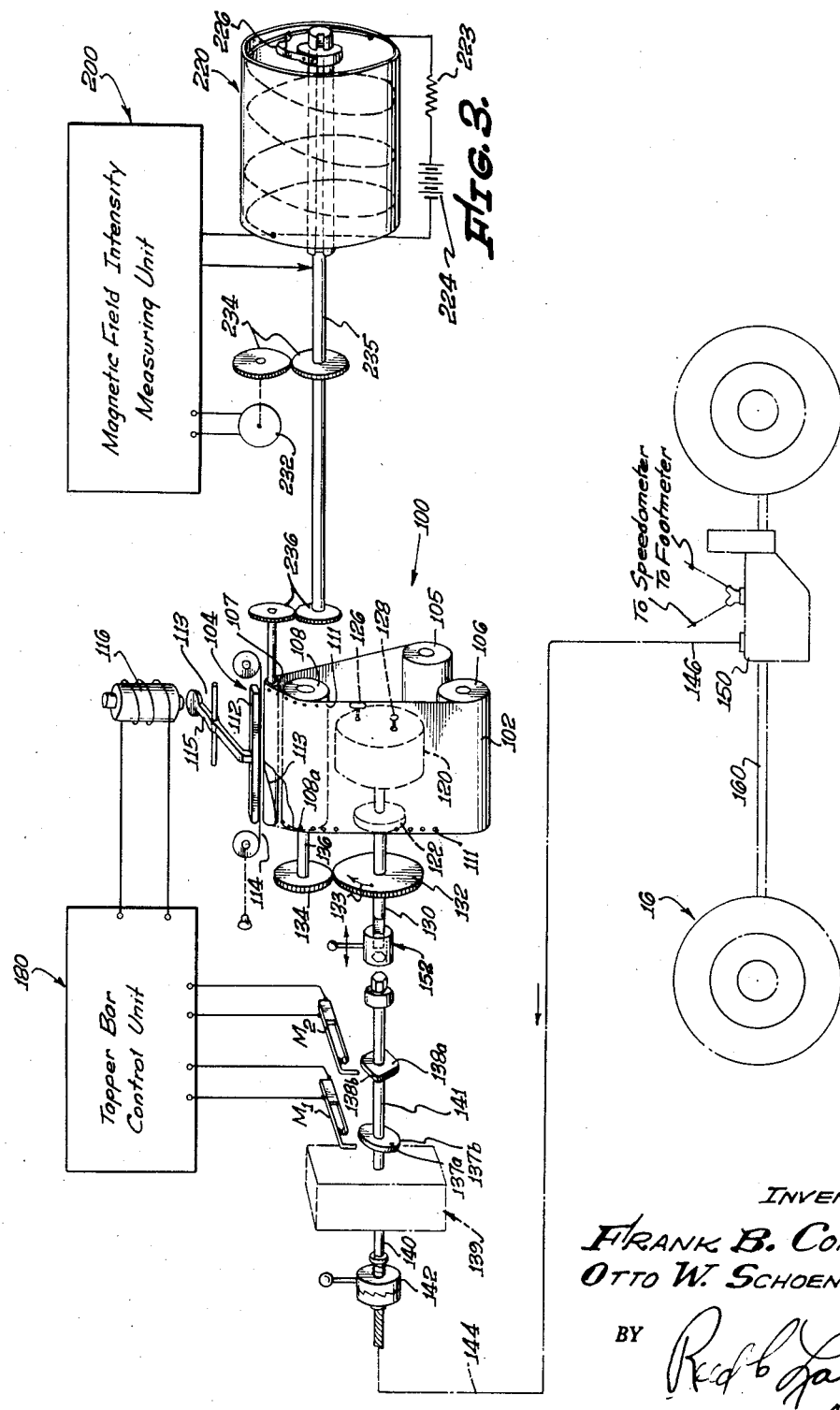
INVENTORS.
FRANK B. COKER,
OTTO W. SCHOENBERG,
BY
ATTORNEY.

Sept. 1, 1959          F. B. COKER ET AL          2,902,636
RECORDING SYSTEM
Filed Nov. 12, 1953                              3 Sheets-Sheet 3

INVENTORS.
FRANK B. COKER,
OTTO W. SCHOENBERG,
BY
ATTORNEY.

United States Patent Office 2,902,636
Patented Sept. 1, 1959

2,902,636

RECORDING SYSTEM

Frank B. Coker, Monterey Park, and Otto W. Schoenberg, Pasadena, Calif., assignors, by mesne assignments, to United Geophysical Corporation, Pasadena, Calif., a corporation of California Application November 12, 1953, Serial No. 391,577

8 Claims. (Cl. 324—8)

This invention relates to a geophysical surveying and more particularly to a system for making continuous recordings of variations in the strength of the magnetic field of the earth along a line of survey or exploration.

In making a magnetometric survey of an area of the earth's surface, measurements are made of the differences in the strength of the earth's magnetic field at different points in the area under investigation. In one system disclosed in co-pending patent application Serial No. 391,421, filed by Frank B. Coker et al., November 12, 1953, now Patent No. 2,777,112, a magnetic field intensity detector is carried at the other end of a boom extending rearwardly from a truck and the measurements of the intensity of the earth's magnetic field are made at various points along a line of survey, or exploration, over which the truck travels. By driving the truck over a grid of lines in the area under investigation, a detailed survey may be made of the distribution of magnetic flux in the area. The measurements of the magnetic field intensity are plotted on a map of the area and contours of anomalies in the distribution of magnetic flux may be ascertained. By studying such anomalies it is sometimes possible to ascertain the location of sub-surface structures which contain mineral deposits, such as deposits of oil or gas or deposits of iron ore or other magnetic materials. The present invention deals with a system for recording variations in the strength of the earth's magnetic field substantially continuously while a vehicle carrying a magnetometer travels along a survey line.

An object of this invention is to provide an improved system for recording variations of a physical characteristic of the earth that varies along a survey line.

Another object of the invention is to provide a system which may be employed for recording variations in a physical characteristic that varies along a survey line or which may be employed to detect changes in a physical characteristic or changes in characteristics of the apparatus itself while it is held stationary at a fixed position.

Another object of the invention is to provide such a recording system in which a strip of recording medium is advanced past a recording device at a speed proportional to the speed of the vehicle along a survey line, so that the scale of the record produced is uniform along its length and independent of variations in the speed of travel of the vehicle.

Another object of the invention is to provide a recording system which makes marks on a record strip at positions thereon that are indicative of the value of a physical characteristic being measured as a vehicle carrying a detector of such physical characteristic moves along on a survey line, and wherein the marks are made at uniform intervals on the strip of recording medium each time that the vehicle has travelled a predetermined distance.

Another object of the invention is to provide an arrangement for correlating the readings of a continuous recorder with the positions on a survey line to which the measurements correspond.

Another object of the invention is to provide a system for making a magnetometric survey along a survey line adjacent the surface of the earth which system employs a vehicle carrying a magnetometer and a recorder for making continuous recordings of the variation of field strength along a survey line.

Another object of the invention is to provide an arrangement for compensating at the position of a magnetic field intensity detector the magnetic field produced there by a vehicle that carries the detector and that comprises ferromagnetic parts.

Another object of the invention is to provide a method for compensating for variations in the effects of the magnetic field produced by a vehicle at a magnetometer detector element carried thereby when the orientation of the vehicle is changed.

Still another object of the invention is to provide an improved arrangement for measuring the orientation of a vehicle comprising ferromagnetic parts and that carries a magnetometer for detecting magnetic anomalies.

The foregoing and other objects of this invention will appear more fully from a consideration of the detailed description of the embodiment of the invention that is illustrated in the accompanying drawings wherein:

Fig. 1 is a perspective view of a motor truck employing the invention;

Fig. 2 is a perspective view of the inside of the cab of the motor truck;

Fig. 3 is a schematic diagram of the invention;

Figure 4:
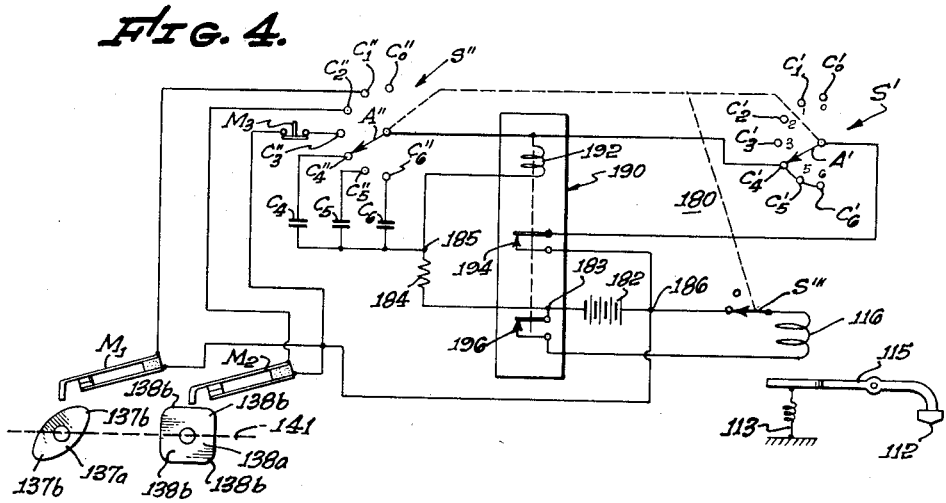
Fig. 4 is a circuit diagram of the control unit that operates the recording device.

Referring to the drawings and more particularly to Figs. 1 and 2 there is shown an embodiment of the invention in which a magnetometer detector element is carried at the outer end of a rearwardly extending boom 12 supported by a motor truck 14. Such a magnetometer may be of the type illustrated in the co-pending patent application Serial No. 391,421, filed by Frank B. Coker et al., November 12, 1953, in which the detector element is automatically maintained in alignment with the ambient magnetic field of the earth as the truck travels along the line of survey. Some parts 15a of the mechanism 16 (see Fig. 5) for maintaining such alignment are mounted at the end of the boom 12 together with the detector element 10 and some of them 15b are mounted within the cab 17 of the truck, the latter parts being contained within an instrument cabinet 18 and electrically connected to the former. It is not deemed necessary to illustrate and describe the magnetometer detector element or such means for automatically maintaining it in alignment with the earth's magnetic field in this application as many types of such equipment are well known. Mechanisms of this type are disclosed in Vacquier et al. Patent No. 2,555,209.

A magnetic field measuring unit 200 also mounted in the instrument cabinet 18 is employed to measure the strength of the magnetic field at various points or at least the difference between the strength of the magnetic field at various points and the strength that the magnetic field has at some reference point. The output of such transducer is applied to an automatic data recorder 100 which is rigidly secured to the instrument panel at the front of the cab 17. The recorder operates to make marks on a record strip 102 indicating the strength of the magnetic field. These marks are made in synchronism with the movement of the truck along its course and data respecting the movement of the truck are recorded in such a way that the measurements of magnetic field strength may be readily correlated with positions in the area surveyed.

Figure 7:
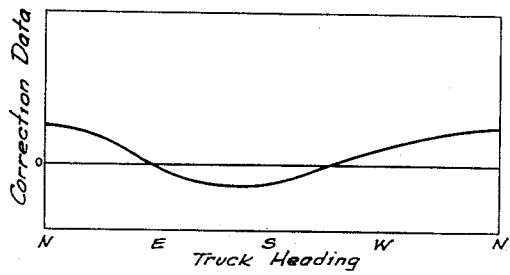
Fig. 7 is a graph showing the variation of correction factor with truck heading.

It is also a value at times to know the direction of orientation of the truck corresponding to particular measurements in order that corrections of the observations may be made for the disturbance that the truck itself creates in the earth's magnetic field by virture of the parts such as the body and engine that are composed of ferromagnetic material. This disturbance varies with the orientation of the truck. The variations of such disturbance with the orientation of the truck are ascertained by driving the truck in a closed circle or other loop and recording the variations in the strength of the magnetic field actually observed. These variations may then be employed to make corrections for such disturbance at other points. A graph showing correction factor as a function of truck orientation is shown in Fig. 7. Such corrections are made by subtracting from the field strength measured at any point, the error introduced by the truck in the orientation that the truck possesses at that point.

In practice, the truck itself often produces a substantial magnetic field at the position of the detector element. This field may be largely offset by means of a suitably oriented permanent magnet M intermediate the ends of the boom 12. Spurious effects of the equipment on the magnetic field intensity at the position of the detector is minimized by employing a boom that is composed of a nonmagnetic material such as aluminum.

In order to facilitate correlation of the measurements indicated on the record paper 102 with positions on the ground, and for other purposes, the truck is provided with instruments including a speedometer 20, a footmeter 44 and a gyro-compass 22, for accurately indicating the speed of the truck, the distances travelled from a reference point and its direction of travel or orientation. In addition, a suitable sound recorder such as a magnetic tape recorder 30 provided with a microphone 32 is employed to record information regarding the position and movement of the truck simultaneously with the recording of data on the record paper 102. The sound recorder 30 is provided with a suitable switch 34 by means of which it may be operated whenever desired in order to record the data in question. It is also provided with a set of headphones 36 to permit the operator to reproduce a sound record which he has previously made whenever he wants to review the recorded information. Suitable controls of types well known in the art are incorporated in the sound recorder to permit rewinding the tape to enable it to be played back and then to drive it in its normal direction either for listening or for recording.

Two people generally operate the equipment, namely a truck-driver and an equipment operator, though it is possible for one person to perform the duties of both.

As the truck travels along a line of survey, the record paper 102 is moved automatically and continuously past a recording device 104 which marks on the paper at positions indicative of the strength of the earth's magnetic field at various points along the survey line. The speedometer 20 which is of conventional type and which may be driven for example by one of the drive shafts of the truck indicates the speed of travel. The gyro-compass indicates the direction of travel.

By employing a gyro-compass rather than an ordinary compass, accurate indications of direction of travel which are substantially free of any error that might otherwise be introduced by the very magnetic anomalies which are to be located, are avoided. The footmeter 24 which is operated by the drive shaft of the truck as more fully described below, indicates the distance traveled by the truck from any fiducial or reference point at which the footmeter has been set at zero. Differences in readings of the footmeter indicate the distance traveled from a reference point to an observation point.

With such apparatus, as the truck travels along a survey line, information regarding the direction of travel and position of the truck is spoken by the operator into the microphone 32 at suitable intervals while the sound recorder 30 is operated. In order to make such records, a number that identifies the position is recorded by means of a pencil or pen on the exposed or visible portion of the record paper 102 at a predetermined distance in advance of the recording device 104, that is, in advance of the actual position of the data being recorded at that time on the record paper 102. At the same time that such indicia are applied to the record paper 102, the magnetic tape recorder is rendered operative by manipulation of the switch 34, and the operator speaks the information into the microphone 32. Such information would include, for example, the following: the indicia just recorded on the record paper 102, the speed indicated by the speedometer 22, the direction of travel as indicated by the gyro-compass 22, the indication of the footmeter 24, any unusual circumstances such as rapid changes in the data indicated on the record paper 102, and any information regarding local characteristics of the terrain. Other data that are recorded by means of the magnetic tape recorder is the time of the observation and the sensitivity of the instrument and any other information that is believed will prove useful later in interpreting the data on the paper record.

It will be noted that if the line of survey follows a curved road or one made up of a series of straight lines, the information indicated by the footmeter and the information indicated by the gyro-compass are very valuable in plotting the recorded data on a map. While the footmeter indicates distances traveled along the road or other travel path, the direction indicated by the gyro-compass is employed in order that the data indicated on the record paper 102 may be properly and accurately corrected for the orientation of the vehicle. The information regarding the direction of travel at the time that an observation is made is particularly important where the changes in magnetic field intensity are occurring rapidly or suddenly, and it is desired to plot the measurements accurately on a map. All of the information recorded on the magnetic tape recorder assists in plotting the information on a map and also assists in accurately relocating any anomalies when it is desired to develop the area surveyed to locate any minerals that may be associated with the observed anomalies. This is particularly important where the anomalies indicate the location of relatively small objects such as ore bodies.

A system for making records of variations of magnetic field intensity as a substantially continuous function of distance traveled and for marking the record in synchronism with the movement of a truck carrying the magnetometer in accordance with this invention is illustrated in Fig. 3. This system is also arranged to make a continuous recording while the truck 16 remains stationary. Recordings of this type are desired in order to facilitate testing the equipment under conditions under which no changes in the intensity of the magnetic field occur and also for recording variations that occur in the intensity of the earth's magnetic field as a function of time, such as during magnetic storms. To simplify the explanation, the operation of the system with the truck stationary will be described first. Then the operation of the system with the truck in motion will be described.

The recorder includes a supply drum or roller 105 upon which unmarked record paper is stored and a take-up drum or roller 106 on which the marked record paper is stored. The record paper itself is threaded over a marking drum or roller 107 and a driving drum or roller 108. In order to advance the record paper 102 over the marking drum or roller 107, the paper itself is provided with perforations 111 which mesh with teeth 108a on the driving drum 108. In the embodiment illustrated two different means are available for driving the driving drum, one of these means being a clock-motor 120 operated by a self-contained clock spring (not shown) and the other means being a mechanical drive including a gear box 139 which is driven by the transmission drive shaft 160. A spring (not shown) operates the take-up drum to take up any slack in the paper.

The driving mechanism includes a countershaft 130 which carries a driving gear 132 meshing with a driven gear 134 that is keyed to the shaft 136 to which the driving drum 108 is rigidly attached. The clock motor 120 is connected to one end of the countershaft 130 through a one-way slip clutch 122. The one-way drive element 122 is of a kind which permits motion to be communicated between the clock motor and the countershaft 130 when the clock motor 120 is operating to rotate the gear 132 in the direction indicated by the arrow 133. However, the one-way element slips when the clock motor 120 is inoperative and the gear 132 is moved in the direction indicated by the arrow 133 by some other means. The clock motor 120 is provided with a spring that is energized by a winding stem 126 and is operated when the start-stop arm 128 is closed. Thus when the clock motor is operated, it drives the driving drum 108 through the slip clutch 122, the countershaft 130 and the gears 132 and 134.

Adjacent at the other end of the countershaft 130 there is arranged a speed-reducing gear box 139 having an input shaft 140 and an output shaft 141. The input shaft 140 of this gear box is connectable through a ratchet clutch 142 to a flexible cable 144 that contains a rotatable element that is driven by the output shaft 146 of a gear box 150 that is connected to the drive shaft 160 of the vehicle 16. Two cams 137a and 138a are keyed to the output shaft 141, the former being provided with a pair of diametrically opposite cam elements or lobes 137b and the latter with two pairs of diametrically opposite cam elements or lobes 138b symmetrically spaced. These cams are employed to operate relays periodically as described more fully hereinafter. A second clutch 152 is arranged between the output shaft 144 and the adjacent end of the countershaft 130. When the clutches 142 and 152 are engaged, rotational motion of the drive shaft 160 is communicated through the gear box 150 and cable 144 and clutch 142 to the gear box 139 thereby driving the output shaft 141 and the countershaft 130 at reduced speed if the truck is traveling in a forward direction; but no such motion is communicated to the gear box 139 or to the countershaft 130 if the truck is traveling in a rearward direction. The employment of a one-way clutch 142 between the gear box 139 and flexible cable 144 prevents any transmission of rearward motion either to the driving drum 108 or to the clock motor 120 even if the clutch 152 be engaged.

The second clutch 152 is disengaged whenever it is desired to operate the recorder by means of the clock motor 120 thereby removing any load that might impede the operation of the clock motor. Whenever the truck is being driven to or from a survey area, clutch 142 is disengaged to avoid any unnecessary wear of the parts driven thereby as well as to avoid wasting of paper when recordings are not being made.

The recording device 104 includes not only the marking drum 107 but also an inked "typewriter" ribbon 114 and a tapper 112 which may be raised and lowered vertically to mark the paper 102. The marking drum 107 includes a raised helix 113 that makes a little more than one turn thereon from one edge of the paper to the other. The tapping bar 112 extends longitudinally of the marking drum 110 along the upper edge thereof being supported for upward and downward movement above the ribbon 114 by means of a steel lever 115. In use, the ribbon 114 is located above the recording paper 102 along the upper side of the marking drum 107 and just beneath the tapping bar 112. A solenoid 116 acts upon the free end of the lever 115 to cause the bar 112 to strike the ribbon 114 and marked record paper 102 directly above the portion of the helix 113 which is then at the uppermost part of the marking drum 107. The bar is raised upwardly by a spring 113. As explained hereinafter, the marking drum 107 is rotated through an angle corresponding to the change in strength of the magnetic field being measured and the solenoid 116 is energized periodically by unit 180 to drive the tapper bar 112 downwardly against the force of the spring 113 as the paper 102 is advanced past the marking device 104.

Figure 6:
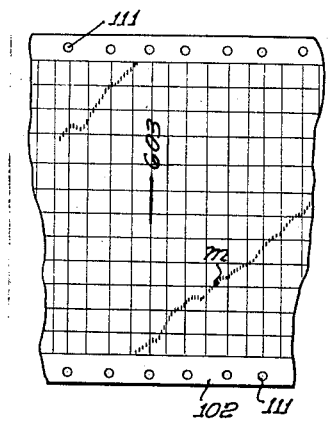
Fig. 6 is a fragmentary view of a record produced in accordance with this invention.

As a result, marks are made on the record paper at distances from the edge thereof which are proportional to or otherwise correspond to the strength of the magnetic fields being measured. A record of the type made by driving the recorder while the truck is in motion is indicated in Fig. 6. There it will be noted that marks M that appear successively along the length of the record are displaced from the edge by distances indicative of the strength of the magnetic field of the earth at the points thereof at which the magnetometer was located at the time the respective marks were made. On the part of the record there illustrated it will be noted that there is printed a number 603 indicating the station at which a sound record was made with the magnetic tape recorder 30. No figure illustrating the magnetic tape records reproduced at the same time is shown since it is well known that the data recorded on such a record are invisible even through it is reproducible in audible form.

A unit 180 for operating the tapper bar manually at will, or else periodically, either as a function of time or as a function of travel distance is illustrated in detail in Fig. 4. The control circuit 180 includes a pair of ganged selector switches S' and S'', which are selectively settable in seven positions indicated by the numbers 0, 1 . . . 6 in which corresponding contacts as $C_0'$, $C_1'$ . . . $C_6'$ and $C_0''$, $C_1''$ . . . $C_6''$ are closed by the movable arms A' and A'' respectively of the switches. The contacts $C_0'$ and $C_0''$ in the zero position are not connected to any parts of the circuit. Accordingly, the zero position is an "off position" in which the switch arms A' and A'' do not make connection with any parts of the circuit other than the parts that are permanently connected to these arms. The contacts $C_1'$ and $C_2'$ and $C_3'$ are likewise blank. However, the contacts $C_1''$, $C_2''$, and $C_3''$ are connectable to a terminal or junction 186 at one end of the solenoid 116 through switches $M_1$, $M_2$, and $M_3$ respectively. The first two switches are normally closed micro-switches which are opened when actuated by the elements 137b and 138b of the corresponding cams 137a and 138a. The third switch $M_3$ is a normally-closed manually operable push-button switch. The arm of A'' of switch S'' is connected to the junction 186 through a winding 192 of relay 190, through resistor 184 and a battery 182. The arm A' of switch S' is connected to the junction 186 through normally closed contacts 194 of relay 190. The other end of the solenoid coil 116 is connected through normally closed contacts 196 of relay 190 to the junction 183 between resistor 184 and battery 182. The junction 185 between the resistor 184 and the winding 192 is connected through condensers $C_4$, $C_5$, and $C_6$ to the contacts $C_4''$, $C_5''$, and $C_6''$ of the second switch. The control unit 180 also includes a third switch S''' that is ganged to switches S' and S''. The third switch S''' is connected between the junction 186 and the solenoid 116 and is open when the other switches S' and S'' are in the zero position and is closed when they are in positions 1 to 6.

When the switches S' and S'' are located in the zero position, the solenoid 116 is unenergized and cannot be operated. But when the switches S' and S'' are in any of the remaining positions namely positions 1 . . . 6, the solenoid 116 may be periodically operated. More particularly when the switches S' and S" are in positions 1 or 2 the solenoid 116 is energized periodically in synchronism with the movement of the truck and at intervals corresponding to equal travel distances of the truck. When the switches S' and S" are in position 3, the solenoid 116 may be operated by manually depressing the push button switch $M_3$. And when the switches S' and S" are in positions 4, 5, or 6 the solenoid 116 is operated periodically at intervals spaced apart by times that correspond to the values of the capacitances of the condensers $C_4$, $C_5$, and $C_6$ irrespective of whether the truck is in motion.

Consider for example the action of the control unit 180 when the switches S' and S" are in position 1 in which contacts $C_1'$ and $C_1''$ are closed. When the switches S' and S" are so set, then if the clutches 142 and 152 are engaged and the truck 16 is traveling in a forward direction the cam 137a opens the microswitch $M_1$ twice in each rotation of the output shaft 130. More particularly with the switches so set, while the microswitch $M_1$ is closed, a circuit is completed between the battery 182, through the resistor 184, and the relay winding 192, thereby operating relay 190 and opening the contacts 196 to de-energize the solenoid winding 116. However, each time the microswitch $M_1$ opens, this circuit is broken thereby restoring relay 190 causing the solenoid winding 116 to be energized.

When the switches S' and S" are in position 2, cam 138a opens the second microswitch $M_2$ periodically but four times during each rotation of the countershaft 130, similarly marking the record 102 but at points corresponding to shorter intervals along the line of survey.

In either event, as previously explained, a mark is made on the record 102 each time the solenoid winding 116 is energized. Accordingly, successive marks on the record made while the switches S' and S" are in position 1 or 2 represent measurements of the earth's magnetic field at equally spaced points along the line of survey. The spacings between the marks on the record paper are shorter in one case than in the other but the scale of the record is the same in both cases.

Consider now the operation of the control system 180 when the switches S' and S" are in position 3. When in this position, the relay 190 is restored whenever the switch $M_3$ is opened thereby energizing the solenoid winding 116.

Consider now the operation of the control unit 180 when in positon 4. In this position, the condenser $C_4''$ is connected in parallel with the winding 192 of relay 190. At the same time the arms A' and A" of the two switches S' and S" are connectible to the junction 186 through the normally-closed contacts 194. When the switches S' and S" are in this position, the relay 192 is operated and restored periodically by the charging and discharging of the condenser $C_4$, thereby periodically de-energizing and energizing the solenoid winding 116. With the switches S' and S" so set, when the winding 192 is unenergized, current from the battery 182 flows through the contacts 194 partly through the condenser $C_4$ and partly through the relay winding 192 and thence through the resistor 184 to the other end of the battery 182. When the voltage appearing across the condenser $C_4$ attains a predetermined value, sufficient current flows through the relay winding 192 to operate the relay 190. When the relay 190 operates, contacts 194 and contacts 196 open, thereby deenergizing the solenoid winding 116 and at the same time discharging the condenser $C_4$ through the relay winding 192. When the voltage across the condenser $C_4$ falls to a sufficiently low value, relay 190 restores, closing contacts 194 and contacts 196, thereby completing a cycle of operation. Thereafter the condenser $C_4$ is charged again by the flow of current from the battery 182 and the cycle of operation repeats itself. In a similar manner when the switches S' and S" are in position 5 or 6, the solenoid winding at 116 is energized periodically at regular timed intervals. In all cases the time intervals depend upon the time constant determinded by the resistor 184 and the condenser $C_4$, $C_5$ or $C_6$ and the voltage of battery 182 and the operating and restoring voltages of relay 190. In practice the periods of operation are set at different values of about 1, 4 and 10 sec.

Figure 5:
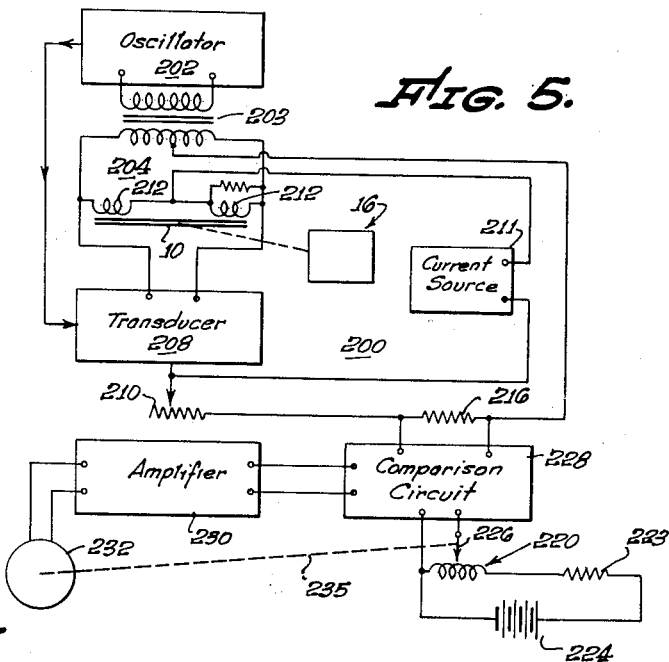
Fig. 5 is a schematic diagram of the magnetic field intensity measuring unit.

The magnetic field intensity measuring system 200 may be of the type described and claimed in co-pending patent application Serial No. 391,575, filed by Frank B. Coker, November 12, 1953. As shown in Fig. 5, the measuring system 200 comprises an oscillator 202 that impresses an alternating current voltage of a carrier wave frequency of 400 cycles per second through a transformer 203 on an unbalanced bridge circuit 204. The output of the bridge circuit and also a signal from an oscillator 202 is impressed upon a transducer 208 which adjusts the value of the resistance of a variable resistance means 210 to a value corresponding to the intensity of the magnetic field to which the detector element 10 in the bridge circuit 206 is exposed as explained in said co-pending patent application.

The resistance of the resistor 210 automatically adjusts the current flowing from a current source 211 through the windings 212 on the detector element 10 to produce a compensating magnetic field that balances the ambient magnetic field. This current flows through a precision resistor 216, thus generating a voltage proportional in magnitude to the intensity of the ambient magnetic field. As further explained in that application, the voltage appearing across the precision resistor 216 is automatically balanced against a portion of the voltage appearing across a helical potentiometer 220, the balancing being accomplished in such a way as to operate the recorder 100 to indicate the strength of the magnetic field.

More particularly the potentiometer 220 is connected through a resistance 223 to a constant voltage source 224. The variable voltage appearing across a portion of the potentiometer 220 between one end thereof and a sliding contact 226 is applied to a comparison circuit 228 together with a voltage that appears across the precision resistor 216. The output of the comparison circuit is proportional to the difference between the voltage across the resistor 216 and the portion of the potentiometer 220 that is connected to the comparison circuit 228. This output is amplified in an amplifier 230 and is employed to operate a servo-motor 232 that drives the shaft 235 of the potentiometer 220 which is of the helical type having a plurality of turns. Such potentiometers are manufactured and sold under the trademark "Helipot." The marking drum 107 is driven by the shaft 235 through gears 236 having a gear ratio of unity. Thus if the helical potentiometer 220 has ten turns, the marking drum 107 rotates ten times when the sliding contact 226 moves from one end of the potentiometer to the other, thereby varying the voltage supplied by the potentiometer to the comparison circuit. As indicated in Fig. 6 one section of the graph terminates at one edge of the record as another section of the graph is commenced at the other edge. By noting the number of graph sections between any two readings, the differences between them may be readily ascertained. Suitable stops (not shown) prevent the potentiometer from being driven beyond its limits of operation.

With the system described above, records representing the variation of the intensity of the earth's magnetic field along the surface of the earth may be made as the motor truck travels along the earth's surface. By operating the recorder off the drive-shaft of the truck, the scale of successive records made along different survey lines is uniform irrespective of variations of the truck speed. This facilitates comparing data taken along different parallel lines merely by placing the records in side-by-side relationship. In any event, by taking due account of the various facts of which a sound record has been made, the data obtained may be plotted accurately on maps. The scale of the records may, of course, be changed from one area to another by replacing gears 132 and 134.

It will be noted that records may be made by operating the clock motor 120 when driving along a survey line. When employing the clock motor to drive the recorder, the switches of the control unit are set in position 4, 5, or 6 so that marks are made on the record at regular known time intervals. In such a case, it is desirable to record with the magnetic recorder the indication of the speedometer along with other data as explained hereinabove. From the speed indicated and the known frequency or period of marking, it is a simple matter to determine the positions on the survey line to which the indications on the record strip correspond.

It is characteristic of the electrical equipment such as that employed in the magnetic field intensity circuit used in this invention, that the sensitivity of the circuit varies during the period in which the various parts such as the amplifier tubes et cetera warm up. Variations also occur in the sensitivity for other reasons from time to time. In order to ascertain whether the measuring system has attained stability, the truck is held stationary in a fixed position. In this case, a recording is made by setting the switches of the control unit in the position 4, 5, or 6 and operating the recorder by means of the clock motor.

As explained hereinabove the clutch between the gear box and the countershaft is disengaged during such a recording in order to remove any unnecessary mechanical load from the clock motor.

Though only one embodiment of the invention has been described, it will be understood that the various parts thereof may be arranged in other ways than that described and that many changes may be made in the systems without departing from the principles of the invention. It will be understood in particular that it is not necessary to employ a vehicle which utilizes its own engine but that the instruments may be mounted on a trailer or other suitable vehicle. It will also be understood that many of the features of this invention may be employed in equipment used to measure other kinds of fields or physical characteristics of the earth that vary along a survey line. More particularly, it will be understood that the recording system and the arrangement for operating it either in accordance with the speed of the vehicle or at regular time intervals may be employed with a system that measures variations in the intensity of natural radiation being emitted upwardly from various materials in the terrain over which the vehicle is travelling. It will also be understood that while the invention has been described with reference to an instrument which responds in proportion to the deviation of the intensity of the magnetic field from some reference value, the invention may be practiced in an arrangement in which such proportionality does not exist but in which nevertheless the indications of the recorder vary in some regular fashion with the intensity of the magnetic field under investigation.

It is therefore to be understood that the invention is not limited to the specific embodiment thereof illustrated and described herein but includes all embodiments coming within the scope of the appended claims.

The invention claimed is:

1. In apparatus for recording variations in the strength the earth's magnetic field along a survey line at the earth's surface: a vehicle having wheels and adapted to be driven on the ground along such survey line, said vehicle comprising parts composed of ferromagnetic material; a recorder on said vehicle, said recorder including a recording device for recording data on a strip of recording medium; a detector supported by a boom at a position remote from said vehicle, said detector being adapted to respond to the earth's magnetic field in accordance with the intensity thereof, said boom being composed of non-magnetic material; means for advancing said recording medium past said recording device; and means controlled by said remote detector for operating said recording device on said vehicle to indicate on said recording medium the strength of said magnetic field.

2. In apparatus for recording variations in the strength the earth's magnetic field along a survey line at the earth's surface: a vehicle having wheels and adapted to be driven on the ground along such survey line, said vehicle comprising parts composed of ferromagnetic material; a recorder on said vehicle, said recorder including a recording device for recording data on a strip of recording medium; a detector supported by a boom at a position remote from said vehicle, said detector being adapted to respond to the earth's magnetic field in accordance with the intensity thereof, said boom being composed of non-magnetic material; a magnet located on said boom between said vehicle and said detector for counteracting magnetic effects of said vehicle at said detector; and means controlled by said detector for indicating the strength of said magnetic field.

3. In apparatus for recording variations in the strength the earth's magnetic field along a survey line at the earth's surface: a vehicle having wheels and adapted to be driven on the ground along such survey line, said vehicle comprising parts composed of ferromagnetic material; a recorder on said vehicle, said recorder including a recording device for recording data on a strip of recording medium; a detector supported by a boom at a position remote from said vehicle, said detector being adapted to respond to the earth's magnetic field in accordance with the intensity thereof, said boom being composed of nonmagnetic material; means for advancing said recording medium past said recording device; actuating means controlled by said detector for operating said recording device to indicate on said recording medium a magnitude of said characteristic; first means controlled in accordance with the speed of said vehicle along said survey line for operating such recording device periodically at a frequency proportional to the speed; second means for operating said recording device automatically at fixed time intervals irrespective of whether said vehicle is moving or is stationary; and means for rendering a selected one of said first means and second means operative.

4. In apparatus for recording variations in the strength the earth's magnetic field along a survey line at the earth's surface: a vehicle having wheels and adapted to be driven on the ground along such survey line, said vehicle comprising parts composed of ferromagnetic material; a recorder on said vehicle, said recorder including a recording device for recording data on a strip of recording medium; a detector supported by a boom at a position remote from said vehicle, said detector being adapetd to respond to the earth's magnetic field in accordance with the intensity thereof, said boom being composed of nonmagnetic material; means for advancing said recording medium past said recording device; actuating means controlled by said detector for operating said recording device to indicate on said recording medium a magnitude of said characteristic; first means controlled in accordance with the speed of said vehicle along said survey line for operating said recording device periodically at a frequency proportional to the speed; second means for operating said recording device automatically at fixed time intervals irrespective of whether said vehicle is moving or is stationary; third means for operating said recording device at will; and means for rendering a selected one of said first, second, and third means operative.

5. In apparatus for recording variations of a physical characteristic that varies along a survey line at the earth's surface: a vehicle having wheels and adapetd to be driven on the ground along such a survey line; a recorder on said vehicle, said recorder including means including a driven member for advancing a strip of recording medium past a recording device; a detector carried by said vehicle and responsive to changes in the magnitude of said characteristic as the vehicle travels along said survey line; a drive member operated in accordance with the movement of said vehicle and rotatable at a rate proportional to the speed of said vehicle along said survey line; a motor for advancing said recording medium past said recording device at a rate independent of the speed of the vehicle; first clutch means engageable between said drive member and said driven member, said clutch means being operative only when said vehicle is travelling in a forward direction; second clutch means engageable between said motor and said driven member; said first and second clutch means being independently operable and each of said clutch means being selectively coupled to said driven member whereby the same said recorder may be operated at will by said drive member or said motor depending upon the states of engagement of said first and second clutch means, and means controlled by said detector for operating said recording device to indicate on said recording medium a magnitude of said characteristic.

6. In apparatus for recording variations of a physical characteristic that varies along a survey line at the earth's surface: a vehicle having wheels and adapted to be driven on the ground along such a survey line; a recorder on said vehicle, said recorder including means including a driven member for advancing a strip of recording medium past a recording device; a detector carried by said vehicle and responsive to changes in the magnitude of said characteristic as the vehicle travels along said survey line; a drive member operated in accordance with the movement of said vehicle and rotatable at a rate proportional to the speed of said vehicle along said survey line; a motor for advancing said recording medium past said recording device at a rate independent of the speed of said vehicle; first clutch means engageable between said drive member and said driven member; second clutch means engageable between said motor and said driven member; and means controlled by said detector for operating said recording device to indicate on said recording medium a magnitude of said characteristic.

7. In a method of surveying wherein a detector is carried over the surface of the earth by means of a vehicle that affects the indications of the detector by amounts depending on the orientation of the vehicle and wherein the indications of said detector are measured at various points along a survey line at the earth's surface, the steps of: measuring indications of said detector at a position at the earth's surface for a series of orientations of said vehicle relative to the earth's north-south axis whereby the variation of the effects of said vehicle on such characteristic as a function of vehicle orientation is determined; moving said vehicle along a survey line that changes direction along its length; measuring the heading of said vehicle at different points along said survey line; measuring the indications of said detector at said different points; and determining from said latter indications and said headings and said variations of the effect of said vehicle the difference in the value of such characteristic at said points.

8. In a method of magnetometric surveying wherein a magnetic field intensity detector is carried over the surface of the earth by means of a motor vehicle comprising parts composed of ferromagnetic material and the indications of said detector are measured at various points, the steps of: driving said vehicle in a curved path in an area of the earth's surface in which the intensity of the earth's magnetic field is substantially uniform; measuring the orientation of said vehicle relative to the earth's magnetic field at various points on said path; measuring indications of said detector at said positions whereby the variation of the magnetic effects of said vehicle on the earth's magnetic field as a function of vehicle orientation is determined; moving said vehicle along a survey line that changes direction along its length; measuring the heading of said vehicle at different points along said survey line; measuring the indications of the intensity of the magnetic field by means of said detector at said different points; and determining from said latter indications and said headings and said variations of the magnetic effect of said vehicle the difference in the intensity of the earth's magnetic field at said latter points.

References Cited in the file of this patent

UNITED STATES PATENTS

| | | |
|---|---|---|
| 565,636 | Rockwell | Aug. 11, 1896 |
| 769,870 | Morrison | Sept. 13, 1904 |
| 1,504,031 | Drees | Aug. 5, 1924 |
| 2,105,247 | Jakosky | Jan. 11, 1938 |
| 2,208,125 | Feingold | July 16, 1940 |
| 2,220,881 | Barnes et al. | Nov. 12, 1940 |
| 2,404,806 | Lindsey | July 30, 1946 |
| 2,472,944 | Furer et al. | June 14, 1949 |
| 2,502,108 | Taylor | Mar. 28, 1950 |
| 2,611,803 | Rumbaugh et al. | Sept. 23, 1952 |
| 2,777,112 | Coker | Jan. 8, 1957 |

FOREIGN PATENTS

| | | |
|---|---|---|
| 638,147 | Great Britain | May 31, 1950 |

OTHER REFERENCES

Vehicular-Mounted Mine Detector, Electronics, January 1946.

"The Airborne Magnetometer," by J. R. Balsey, Jr., in Preliminary Report of Geophysical Explorations.